United States Patent
Hwang et al.

(10) Patent No.: US 10,309,259 B2
(45) Date of Patent: Jun. 4, 2019

(54) $CO_2$ POWER GENERATION SYSTEM (71) Applicant: DOOSAN HEAVY INDUSTRIES CONSTRUCTION CO., LTD., Gyeongsangnam-do (KR)

(72) Inventors: Jeong Ho Hwang, Daegu (KR); Seung Gyu Kang, Gyeonggi-do (KR); Eung Chan Lee, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 352 days.

(21) Appl. No.: 15/348,660

(22) Filed: Nov. 10, 2016

(65) Prior Publication Data
US 2017/0363002 A1 Dec. 21, 2017

(30) Foreign Application Priority Data

Jun. 15, 2016 (KR) .................. 10-2016-0074667
Jun. 15, 2016 (KR) .................. 10-2016-0074670

(51) Int. Cl.
*F01K 3/20* (2006.01)
*F02C 1/10* (2006.01)
*F01K 11/02* (2006.01)

(52) U.S. Cl.
CPC ............. *F01K 3/20* (2013.01); *F01K 11/02* (2013.01); *F02C 1/10* (2013.01); *F05D 2210/12* (2013.01); *F05D 2220/60* (2013.01)

(58) Field of Classification Search
CPC ... F01K 3/20; F01K 11/02; F02C 1/10; F05D 2220/60; F05D 2210/12
USPC ....................................... 60/650, 682–684
See application file for complete search history.

(56) References Cited

U.S. PATENT DOCUMENTS

| | | | | |
|---|---|---|---|---|
| 6,161,392 A * | 12/2000 | Jirnov | ................. | F25B 9/002 62/87 |
| 2009/0314005 A1* | 12/2009 | Messmer | ............ | F02F 1/4292 60/792 |
| 2012/0039430 A1* | 2/2012 | Abel | ................. | E21B 43/2403 376/325 |

(Continued)

FOREIGN PATENT DOCUMENTS

| KR | 20140116504 A | 10/2014 |
|---|---|---|
| KR | 10-2016-0015235 A | 2/2016 |

(Continued)

OTHER PUBLICATIONS

Patent Cooperation Treaty International Search Report dated Feb. 22, 2017 in corresponding international application PCT/KR2016/008416.

*Primary Examiner* — Hoang M Nguyen
(74) *Attorney, Agent, or Firm* — Invenstone Patent, LLC (57) ABSTRACT

A $CO_2$ power generation system includes a furnace to burn fuel, a turbine operated by a working fluid supplied thereto, the working fluid being heated by heat generated in the furnace, a recuperator exchanging heat with the working fluid passing through the turbine, a cooler to cool the working fluid passing through the recuperator, and a compressor to compress the working fluid passing through the cooler, wherein the working fluid passing through the compressor is circulated to the furnace, and the working fluid is supercritical $CO_2$.

20 Claims, 6 Drawing Sheets

(56) References Cited

U.S. PATENT DOCUMENTS

2013/0113221 A1* 5/2013 Held ................ F01K 25/10
290/1 R
2013/0145759 A1 6/2013 Sonwane
2014/0103661 A1* 4/2014 Kacludis ............ F02C 1/04
290/54
2017/0314420 A1* 11/2017 Bowan .............. F01K 25/02

FOREIGN PATENT DOCUMENTS

| KR | 10-1623309 B1 | 5/2016 |
| KR | 20160059730 A | 5/2016 |
| KR | 10-1628611 B1 | 6/2016 |

* cited by examiner

CO$_2$ POWER GENERATION SYSTEM

CROSS-REFERENCE TO RELATED APPLICATIONS

This application claims priority to Korean Patent Application No. 10-2016-0074670, filed on Jun. 15, 2016, and Korean Patent Application No. 10-2016-0074667, filed on Jun. 15, 2016, the disclosure of each of which is incorporated herein by reference in their entirety.

BACKGROUND

Exemplary embodiments of the present invention relate to a direct-fired supercritical CO$_2$ power generation system, and more particularly, to a direct-fired supercritical CO$_2$ power generation system capable of preheating combustion air and recovering heat from exhaust gas by itself using supercritical CO$_2$, in which no phase change occurs, as a working fluid.

Thermal power generation is generally classified into steam power generation, internal combustion power generation, and special thermal power generation according to heat sources and motors.

Steam power generation is a method of obtaining mechanical energy by generating steam using thermal energy generated when burning fossil fuel such as coal or oil and by supplying the steam to a heat engine, and of obtaining electrical energy by rotating a rotary machine using the mechanical energy. Nuclear power generation is performed in the same manner as using coal or heavy oil except that nuclear power is used as heat generated when burning fuel, and is included in steam power generation. Internal combustion power generation is a method of obtaining mechanical energy by directly using high-pressure gas generated when gas or liquid fuel is evaporated and then ignited/exploded, and of obtaining electrical energy by rotating a rotary machine using the mechanical energy. This internal combustion power generation is preliminary power generation that uses a diesel engine as a motor, and has been used for a long time. Special thermal power generation includes heat-supply power generation, waste heat power generation, two-flow type power generation, geothermal power generation, gas turbine power generation, etc. The gas turbine power generation has been used for independent power generation, together with the internal combustion power generation.

However, the conventional thermal power generation has a problem in that the loss of a turbine occurs due to moisture since a two-phase fluid is present at the outlet of the turbine, whereby the turbine has a limited efficiency. In this regard, since energy, which is required to change the phase of water as a working fluid, must be supplied during the thermal power generation, the heat exchange between a heat source and a working fluid and between a cooling source and a working fluid may be inefficient. In addition, gas-water separation may occur since a drum is installed in a direct-fired heater, and a system and the constituent devices thereof may be complicated in design since steam must be extracted from the turbine to increase the temperature of water supplied thereto in order to enhance the overall efficiency of the system.

BRIEF SUMMARY

An exemplary object of the present disclosure is to provide a direct-fired supercritical CO$_2$ power generation system capable of improving efficiency of power generation by preheating combustion air and recovering heat from exhaust gas by itself using supercritical CO$_2$, in which no phase change occurs, as a working fluid. In addition, another exemplary object of the present disclosure is to provide a direct-fired supercritical CO$_2$ power generation system in which supercritical CO$_2$ is used as a working fluid to prevent inefficient heat exchange by the phase change of the working fluid in a direct-fired heater, and the direct-fired heater is applied to the system using the thermodynamic characteristics of supercritical CO$_2$.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the apparatus and methods as claimed and combinations thereof.

In accordance with one aspect of the present disclosure, a direct-fired supercritical CO$_2$ power generation system includes a furnace to burn fuel, a turbine operated by a working fluid supplied thereto, the working fluid being heated by heat generated in the furnace, a recuperator exchanging heat with the working fluid passing through the turbine, a cooler to cool the working fluid passing through the recuperator, and a compressor to compress the working fluid passing through the cooler, wherein the working fluid passing through the compressor is circulated to the furnace, and the working fluid is supercritical CO$_2$.

The direct-fired supercritical CO$_2$ power generation system may further include a first separator provided at a rear end of the turbine so as to branch the working fluid passing through the turbine into the recuperator and the furnace, a first mixer provided at a front end of the cooler, to mix the working fluid, discharged after heating air introduced into the furnace, with the working fluid cooled by the recuperator, and to supply the mixed working fluid to the cooler, and a second separator provided at a discharge end of the compressor so as to branch the working fluid passing through the compressor into the furnace and the recuperator.

The working fluid branched to the furnace by the first separator may be cooled after heating the air introduced into the furnace, and be transferred out of the furnace, the working fluid branched to the recuperator by the first separator may be cooled by exchanging heat with a portion of the working fluid passing through the compressor, a portion of the working fluid branched by the second separator may be heated by the working fluid branched from the recuperator by the first separator, and the remainder of the working fluid branched by the second separator may be heated by depriving exhaust gas, discharged from the furnace, of heat.

The furnace may include an economizer provided at a discharge end of the exhaust gas so as to recover waste heat of the exhaust gas, a reheater provided above a combustor of the furnace so as to heat the working fluid, a superheater provided at an upper side of the furnace so as to heat the working fluid, and a second mixer provided at a rear end of the recuperator so as to mix the working fluid passing through the economizer with the working fluid heated while passing through the recuperator via the second separator, the working fluid heated by depriving the exhaust gas of heat may be heated by the economizer, and the working fluid passing through the reheater may be heated by the superheater and then be circulated to the turbine.

In accordance with another aspect of the present disclosure, a direct-fired supercritical CO$_2$ power generation system includes a furnace to burn fuel, a turbine operated by a working fluid supplied thereto, the working fluid being heated by heat generated in the furnace, a recuperator exchanging heat with the working fluid passing through the turbine, a cooler to cool the working fluid passing through the recuperator, and a compressor to compress the working fluid passing through the cooler, wherein the working fluid is supercritical $CO_2$, and a cycle that is defined from the furnace to the compressor is a closed loop.

The direct-fired supercritical $CO_2$ power generation system may further include a first separator provided at a rear end of the turbine so as to branch the working fluid passing through the turbine into the recuperator and the furnace, wherein the working fluid branched to the recuperator may be cooled by exchanging heat with a portion of the working fluid passing through the compressor, the working fluid branched to the furnace may be cooled after heating air introduced into the furnace, and a flow rate of the working fluid branched by the first separator may be controlled such that a temperature of the working fluid passing through the recuperator after heat exchange of the working fluid is equal to a temperature of the working fluid after the working fluid heats the air introduced into the furnace.

The direct-fired supercritical $CO_2$ power generation system may further include a first mixer provided at a front end of the cooler, to mix the working fluid, discharged after heating the air introduced into the furnace, with the working fluid cooled by the recuperator, and to supply the mixed working fluid to the cooler, and a second separator provided at a discharge end of the compressor so as to branch the working fluid passing through the compressor into the furnace and the recuperator, wherein a portion of the working fluid branched by the second separator may be heated by the working fluid branched from the recuperator by the first separator, and the remainder of the working fluid branched by the second separator may be heated by depriving exhaust gas, discharged from the furnace, of heat.

The furnace may include an economizer provided at a discharge end of the exhaust gas so as to recover waste heat of the exhaust gas, a reheater provided above a combustor of the furnace so as to heat the working fluid, a superheater provided at an upper side of the furnace so as to heat the working fluid, and a second mixer provided at a rear end of the recuperator so as to mix the working fluid passing through the economizer with the working fluid heated while passing through the recuperator via the second separator.

The working fluid heated by depriving the exhaust gas of heat may be heated by the economizer, a flow rate of the working fluid branched by the second separator may be controlled such that a temperature of the working fluid after heat exchange of the working fluid in the recuperator via the second separator is equal to a temperature of the working fluid passing through the economizer, and the working fluid passing through the reheater may be heated by the superheater and then be circulated to the turbine.

In accordance with still another aspect of the present disclosure, a direct-fired supercritical $CO_2$ power generation system includes a turbine operated by a working fluid, a recuperator exchanging heat with the working fluid passing through the turbine, a cooler to cool the working fluid passing through the recuperator, a first compressor to compress the working fluid passing through the cooler, a second compressor to compress a portion of the working fluid passing through the recuperator, and a furnace into which the working fluid passing through the first and second compressors is introduced to be heated by combustion heat, wherein the working fluid is circulated to the turbine via the furnace, and the working fluid is supercritical $CO_2$.

The direct-fired supercritical $CO_2$ power generation system may further include a separator provided at a rear end of the recuperator so as to branch the working fluid passing through the turbine into the cooler and the second compressor.

The working fluid branched to the cooler by the separator may be cooled by the cooler and then be transferred to the first compressor, the working fluid branched to the second compressor by the separator may be compressed by the second compressor and then be transferred to the furnace, the working fluid transferred to the recuperator via the turbine may be cooled by exchanging heat with the working fluid compressed by the first compressor and then be transferred to the separator, and the working fluid compressed by the first compressor may be recuperated in the recuperator by exchanging heat with the working fluid transferred to the recuperator via the turbine and then be transferred to the furnace.

The furnace may include an economizer provided at a discharge end of the exhaust gas so as to recover waste heat of the exhaust gas, a reheater provided above a combustor of the furnace so as to heat the working fluid, a superheater provided at an upper side of the furnace so as to heat the working fluid, and a mixer to mix the working fluid heated while passing through the economizer with the working fluid recuperated by the recuperator via the first compressor.

The working fluid passing through the second compressor may be transferred to and heated in the economizer, the working fluid mixed by the mixer may be transferred to and heated in the reheater, and the working fluid heated by the reheater may be transferred to and heated in the superheater and then be circulated to the turbine.

In accordance with a further aspect of the present disclosure, a direct-fired supercritical $CO_2$ power generation system includes a turbine operated by a working fluid, a recuperator exchanging heat with the working fluid passing through the turbine, a cooler to cool the working fluid passing through the recuperator, a first compressor to compress the working fluid passing through the cooler, a second compressor to compress a portion of the working fluid passing through the recuperator, and a furnace into which the working fluid passing through the first and second compressors is introduced to be heated by combustion heat, wherein the working fluid is supercritical $CO_2$, and a cycle that is defined from the turbine to the furnace is a closed loop.

The direct-fired supercritical $CO_2$ power generation system may further include a separator provided at a rear end of the recuperator so as to branch the working fluid passing through the turbine into the cooler and the second compressor, and a mixer to mix the working fluid heated while passing through the economizer with the working fluid recuperated by the recuperator via the first compressor.

The furnace may include an economizer provided at a discharge end of the exhaust gas so as to recover waste heat of the exhaust gas, a reheater provided above a combustor of the furnace so as to heat the working fluid, and a superheater provided at an upper side of the furnace so as to heat the working fluid.

The working fluid transferred to the recuperator via the turbine may be cooled by exchanging heat with the working fluid compressed by the first compressor and then be transferred to the separator, the working fluid branched to the cooler by the separator may be cooled by the cooler and then be transferred to the first compressor, and the working fluid branched to the second compressor by the separator may be compressed by the second compressor and then be transferred to the economizer.

A flow rate of the working fluid branched to the second compressor by the separator may be controlled such that a temperature of the working fluid after heat exchange of the working fluid recuperated in the recuperator via the first compressor is equal to a temperature of the working fluid passing through the economizer.

The working fluid mixed by the mixer may be transferred to and heated in the reheater, and the working fluid heated by the reheater may be transferred to and heated in the superheater and then be circulated to the turbine.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

A direct-fired supercritical $CO_2$ power generation system according to exemplary embodiments of the present invention will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

The direct-fired supercritical $CO_2$ power generation system of the present disclosure may use supercritical $CO_2$ as a working fluid, and form a closed cycle in which the working fluid is not discharged to the outside of the power generation system.

The supercritical $CO_2$ working fluid (hereinafter, referred to as "working fluid") in the cycle is heated while passing through a compressor and then passing through a heat source such as a heater, and the fully heated working fluid drives a turbine. The turbine is connected to a generator so as to produce electric power. The working fluid used to produce electric power is cooled while passing through a heat exchanger, and the cooled working fluid returns back to the compressor so as to circulate in the cycle. The turbine or heat exchanger may consist of plurality of turbines or heat exchangers.

The passage through which a working fluid flows in the system is defined as a transfer pipe, and the passage branched from the transfer pipe will be defined as a separate name. In addition, the supercritical $CO_2$ power generation system according to various embodiments of the present disclosure includes a system in which most of working fluids are supercritical fluids and the remainder thereof is a sub-critical fluid, as well as a system in which all working fluids flowing in the cycle are supercritical fluids.

Figure 1:
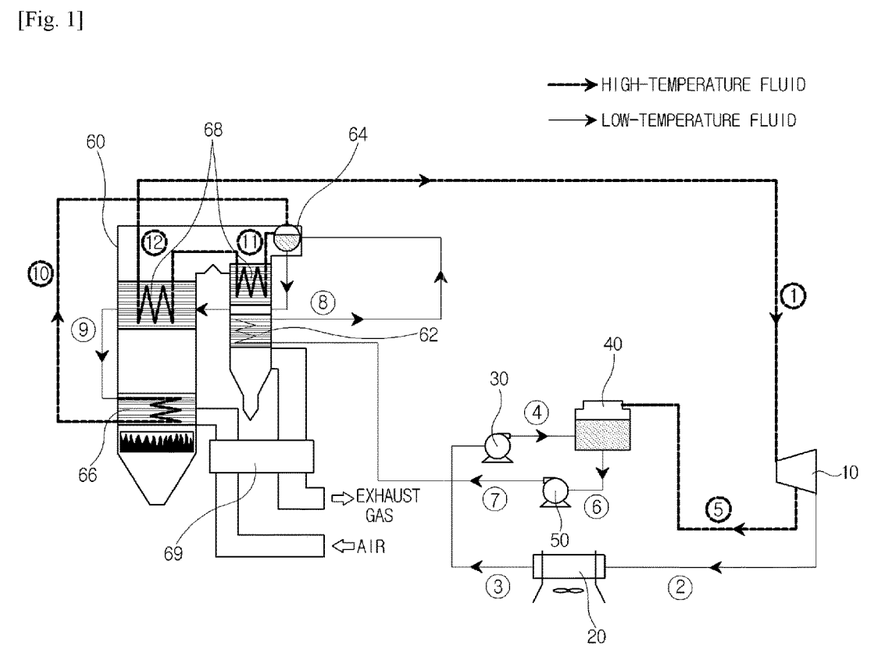
FIG. 1 is a diagram schematically illustrating a steam power generation system.
Figure 2:
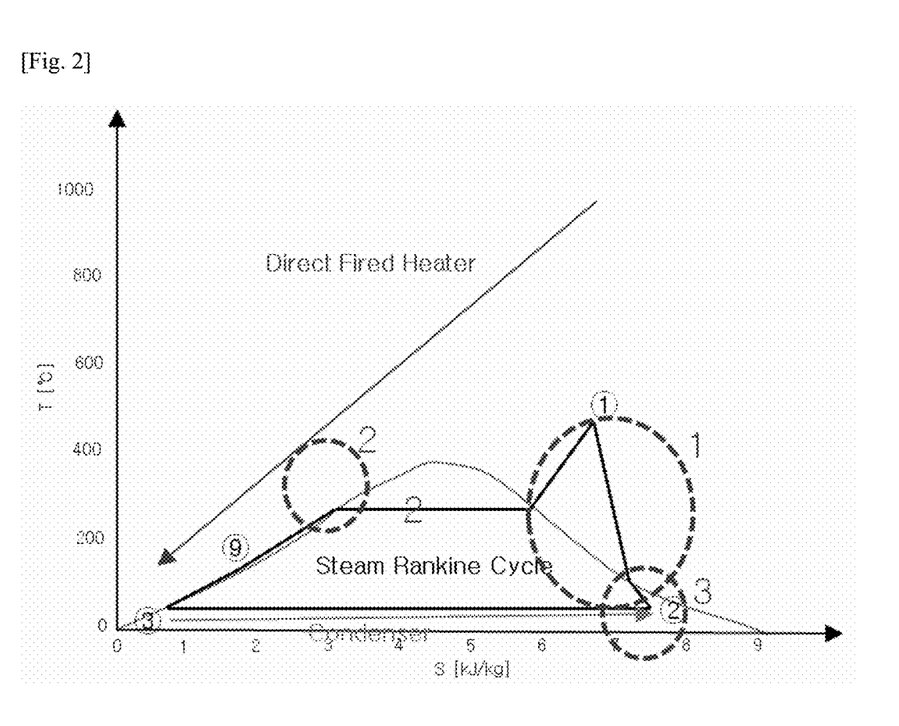
FIG. 2 is a graph illustrating the change of entropy and temperature in the steam cycle of FIG. 1.

FIG. 1 is a diagram schematically illustrating a steam power generation system. FIG. 2 is a graph illustrating the change of entropy and temperature in the steam cycle of FIG. 1.

As illustrated in FIGS. 1 and 2, the steam power generation system produces electric power by supplying and burning fossil fuel, such as coal, to and in a furnace 60, and by undergoing a phase change from water to steam using thermal energy generated in the furnace 60 so as to supply it to a steam turbine 10.

The steam, which has passed through a superheater 68 in the furnace 60, is transferred to the steam turbine 10 and drives the steam turbine 10 (①) of FIG. 2).

The steam, which has passed through the steam turbine 10, is transferred and cooled to and in a condenser 20 (② of FIG. 2), and the cooled water is transferred to a feed water heater 40 by a condensation pump 30. A portion of steam, which is extracted from the steam turbine 10, is transferred to the feed water heater 40, and serves to primarily heat water as a working fluid.

The water introduced into the feed water heater 40 is transferred to an economizer 62 or a fuel gas cooler in the furnace 60 by a furnace supply pump 50.

The economizer 62 is provided at the exhaust end of the furnace 60, and water is heated using the waste heat of exhaust gas discharged after fuel is burned in the furnace 60, and is then supplied to a drum 64 in which gas-water separation occurs.

The drum 64 is provided in the furnace 60, and is a place where the phase heated water is changed so that it is separated into water and steam. The separated steam is transferred to the steam turbine 10 through the superheater 68. The water in the drum 64 is transferred to a reheater 66 provided in the upper portion of the combustion end of the furnace 60, and then returns back to the drum (⑨ of FIG. 2).

Air preheaters 69 are provided in an exhaust discharge part of the furnace 60 and an air induction part into which air is introduced for combustion of fuel, and serve to preheat the air introduced into the furnace 60 using the waste heat of exhaust gas and transfer it to a combustor.

As illustrated in FIG. 2, the outlet of the steam turbine 10 is illustrated in a two-phase region in order to increase or maximize the expansion work of the steam turbine 10 (see the circular section indicated by reference numeral 1 in FIG. 2). Since a large loss occurs due to moisture in this section, it limits the efficiency of the steam turbine 10. Here, the loss due to moisture is about 3% of the whole expansion work of the steam turbine, and since moisture droplets strike the turbine and materials are eroded if the loss due to moisture is 10% or more, the loss is preferably maintained to be less than 10%.

In addition, the water, which has passed through the furnace 60, is supplied to the drum 64 in a two-phase state (the section of ③ to ⑨ in FIG. 2), and the separated water is recirculated to the furnace. Thermal energy may be continuously supplied to the furnace 60 while water as a working fluid is phase-changed to steam. However, since all of the energy is used to change a phase, it is not used to increase the temperature of the working fluid (the rectilinear section indicated by reference numeral 2 in FIG. 2). In this case, a pinch point (a point of the smallest difference in temperature; the circular point indicated by reference numeral 2 in FIG. 2) is formed in the saturated liquid phase of the working fluid. Since a condenser 20 serves to condense a two-phase fluid at the outlet of the steam turbine 10 such that the fluid is a saturated liquid phase, a pinch point is formed at the outlet of the condenser 20 which is a cooling source for condensation.

The above-mentioned steam power generation system is complicated in design since gas-water separation occurs due to the installation of the drum in the furnace as a direct-fired heater. In addition, the steam turbine is complicated in design since steam is extracted in the middle of the expansion of the steam turbine to increase the temperature of water supplied thereto in order to enhance the overall efficiency of the system.

In the present disclosure, since a furnace as a direct-fired heater is applied to a supercritical $CO_2$ power generation system, and supercritical $CO_2$ instead of water is used as a working fluid, the power generation system has a simplified configuration. Hereinafter, two embodiments of the present disclosure will be described. The first embodiment includes two compressors, and the second embodiment uses the temperature of air introduced into the furnace and the temperature of exhaust gas discharged from the furnace.

First, a direct-fired supercritical $CO_2$ power generation system according to a first embodiment of the present disclosure will be described with reference to the drawings.

Figure 3:
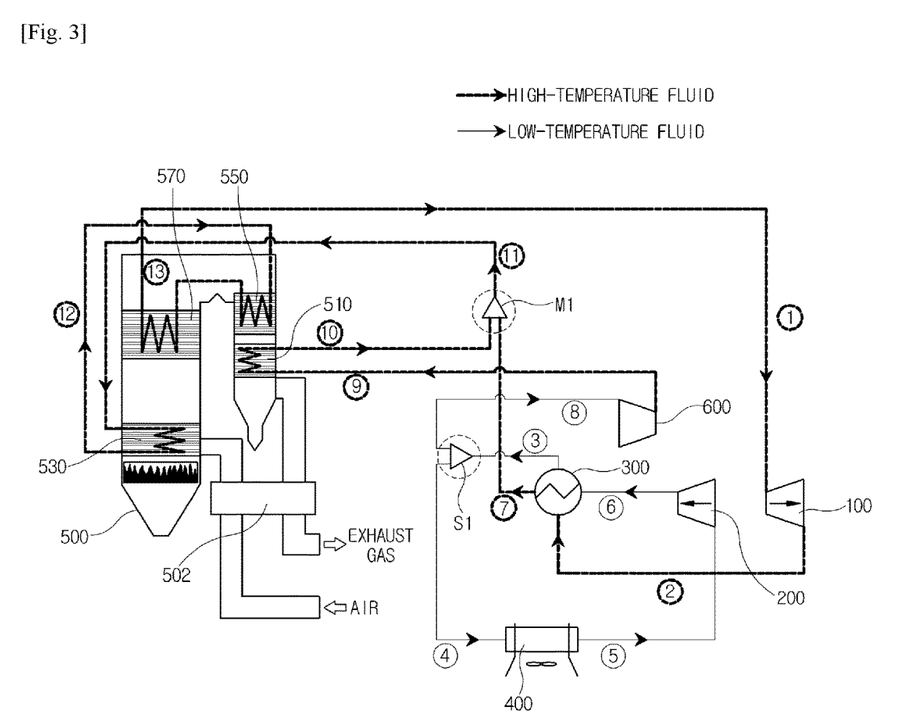
FIG. 3 is a diagram schematically illustrating a direct-fired supercritical $CO_2$ power generation system according to a first embodiment of the present disclosure.
Figure 4:
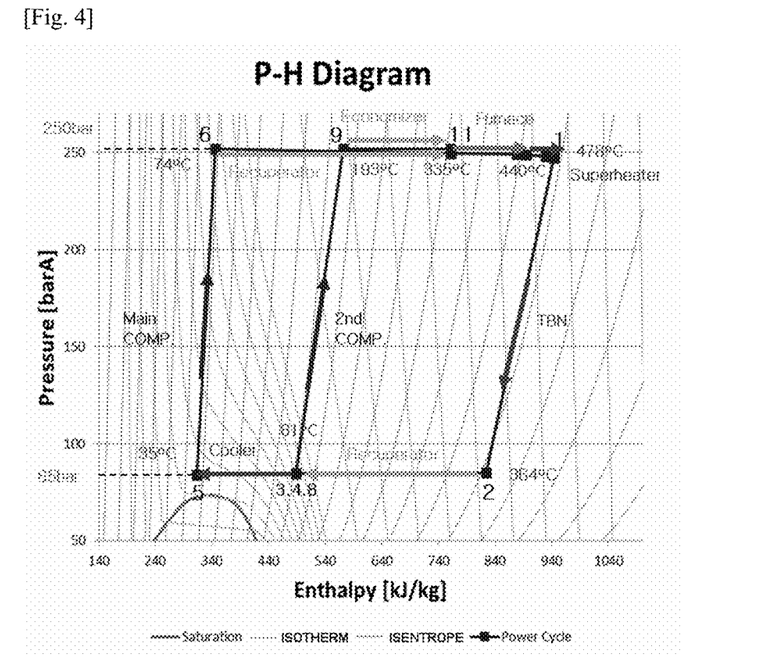
FIG. 4 is a graph illustrating the change of entropy and temperature in the supercritical $CO_2$ cycle of FIG. 3.
Figure 5:
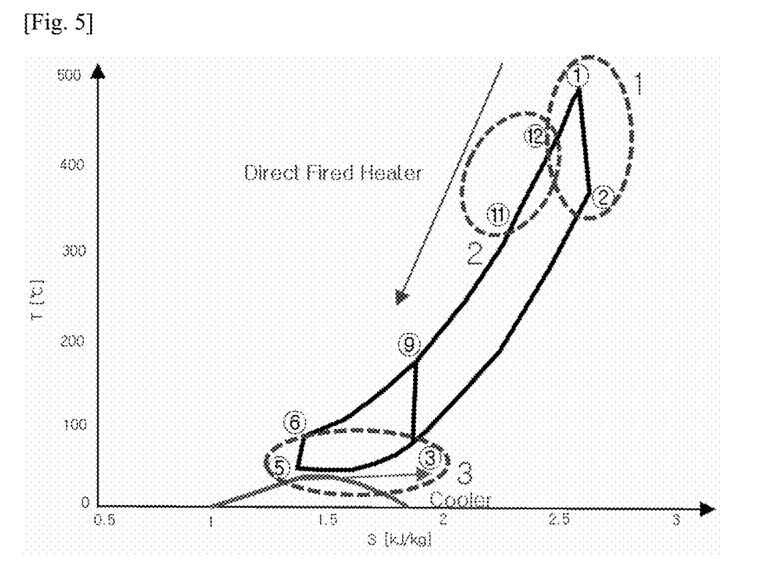
FIG. 5 is a graph illustrating the change of enthalpy and pressure in the supercritical $CO_2$ cycle of FIG. 3.

FIG. 3 is a diagram schematically illustrating the direct-fired supercritical $CO_2$ power generation system according to the first embodiment of the present disclosure. FIG. 4 is a graph illustrating the change of entropy and temperature in the supercritical $CO_2$ cycle of FIG. 3. FIG. 5 is a graph illustrating the change of enthalpy and pressure in the supercritical $CO_2$ cycle of FIG. 3.

As illustrated in FIG. 3, the direct-fired supercritical $CO_2$ power generation system according to the first embodiment of the present disclosure includes a furnace 500 as a direct-fired heater. For convenience' sake, the transfer pipe through which a working fluid flows will be designated by reference numeral indicated in FIG. 3. The furnace 500 includes an air preheater 502, which recovers the waste heat of exhaust gas and preheats outside air introduced thereinto for combustion of fuel, an economizer 510 which recovers the waste heat of exhaust gas, a reheater 530 which is provided above a combustor for combustion of fuel in order to heat a working fluid, and superheaters 550 and 570, which are provided at the upper side of the furnace 500 and heats a working fluid so as to have a high temperature enough to drive a turbine 100.

In addition, the system includes a turbine which expands a working fluid, a recuperator 300 which recuperates a working fluid, first and second compressors 200 and 600 which compress a working fluid, and a cooler 400 which cools a working fluid.

The working fluid, which is heated at a high temperature in the furnace 500, is supplied to the turbine 100 and rotatably drives the turbine 100 (①). The turbine 100 may be connected to a generator so as to produce electric power. The working fluid, which is expanded while passing through the turbine 100, is transferred to the recuperator 300 (②), and the working fluid, which is heat-exchanged in the recuperator 300, is transferred to a separator S1 (③). A portion (flow rate) m1 of the working fluid transferred to the separator S1 is transferred to and cooled by the cooler 400 (④), and the remainder (flow rate) m2 is transferred to the second compressor 600 (⑧). The working fluid cooled by the recuperator 300 is transferred to the first compressor 200 (⑤). The working fluid introduced into the first compressor 200 is compressed to be a low-temperature and high-pressure fluid, and is then transferred to the recuperator 300 (⑥).

The working fluid, which has passed through the turbine 100, has a relatively higher temperature than the working fluid circulated in the cooler 400 or the compressor (however, since the working fluid, which has passed through the turbine, has a lower temperature than the working fluid introduced into the turbine, it is referred to as an intermediate-temperature working fluid.). Therefore, the working fluid, which is transferred from the turbine 100 to the recuperator 300, is deprived of heat by the recuperator 300 to be cooled. In this case, the heat of cooling fluid is supplied to the working fluid which has passed through the first compressor 200. The working fluid cooled by the recuperator 300 is transferred to and branched by the separator S1, and the working fluid branched by the separator S1 is transferred to the cooler 400 and the second compressor 600.

The second compressor 600 compresses a portion of the working fluid cooled by the recuperator 300 to increase the temperature and pressure thereof, and the working fluid compressed by the second compressor 600 is supplied to the economizer 510 of the furnace 500 (⑨).

A mixer M mixes the working fluid, which is heated by the waste heat recovered from exhaust gas in the economizer 510, with the working fluid, which is recuperated in the recuperator 300 through the first compressor 200.

The mixer M is provided outside the furnace 500, and the working fluid mixed by the mixer M is transferred to and heated in the reheater 530 provided above the combustor in the furnace 500 (⑪). Since the working fluid, which is heated once already by the economizer 510 and the recuperator 300, is transferred to the reheater 530 and heated again therein, it is possible to improve the heating efficiency of a working fluid. The working fluid heated by the reheater 530 returns back to the superheaters 550 and 570 provided at the upper side of the furnace 500 (⑫), and the high-temperature working fluid, which is heated enough to drive the turbine 100 in the superheaters 550 and 570, is circulated to the turbine 100 (⑬).

In the supercritical $CO_2$ power generation system having the above configuration, the temperature at the outlet of the furnace 500 is limited to about 450° C. in order to protect the furnace 500, and the temperature required for exhaust gas is about 240° C. in order to preheat air supplied to the furnace 500. Considering these temperature conditions, properly distributing the flow rate of a working fluid and utilizing two compressors help to improve the heat exchange efficiency of the system. In terms of the furnace, the portion provided with the superheaters in the furnace is the highest temperature portion, and since a working fluid flows in the transfer pipe passing through the above portion, the working fluid serves to cool the high-temperature portion of the furnace. Since a working fluid is heated by receiving heat from the high-temperature portion of the furnace and the high-temperature portion is cooled by radiating heat to the working fluid, the temperature at the outlet of the furnace may be limited to a set value.

Accordingly, it is preferable for the flow rate m2 of the working fluid branched to the second compressor 600 by the separator S1 to be controlled such that the temperature (temperature at ⑦) after the heat exchange of the working fluid, which is recuperated by the recuperator 300 through the first compressor 200, is equal to the temperature (temperature at ⑩) of the working fluid, which has passed through the economizer 510.

The temperature and pressure of a working fluid in the above-mentioned supercritical $CO_2$ power generation system will be described briefly with a specific example.

As illustrated in FIG. 4, a working fluid may be discharged at a temperature of about 478° C. from the superheaters 550 and 570, and be introduced into the turbine 100. Since the working fluid is expanded while passing through the turbine 100, the pressure of the working fluid is lowered to a pressure of about 85 bar from about 250 bar, and the temperature thereof is lowered to a temperature of about 363° C.

The pressure of the working fluid is maintained while passing through the recuperator 300 and the cooler 400, and the temperature thereof may be lowered to a temperature of about 35° C. by heat exchange. Subsequently, the temperature and pressure of the working fluid are increased to a temperature of about 74° C. and a pressure of about 250 bar while passing through the first compressor 200, and the working fluid is a low-temperature and high-pressure working fluid. In addition, the temperature and pressure of the working fluid may be increased to a temperature of about 193° C. and a pressure of about 250 bar while passing through the second compressor 600. The working fluids, which are compressed by the first and second compressors 200 and 600, are mixed and transferred to the economizer 510, thereby enabling the mixed working fluid to be heated to a temperature of about 334° C. Subsequently, the working fluid is sufficiently heated to a temperature of about 440° C. to 478° C. so as to drive the turbine 100.

The change of entropy depending on the temperature of a working fluid in the above-mentioned supercritical $CO_2$ power generation system will be described briefly.

Referring to FIG. 5, since the system uses supercritical $CO_2$ as a working fluid, the expansion section (①→②) of the turbine 100 is smaller than that of the steam cycle of FIG. 2, and no phase change occurs therein. Therefore, the heat quantity required for a phase change may be used to heat a working fluid, and thus the efficiency of the system may be improved. In addition, since the system may be configured to have high efficiency, it is possible to manufacture a small turbine.

In addition, since the phase of a working fluid is not changed even while the working fluid passes through the furnace 500 (⑫→⑬), unlike the steam cycle, all of heat quantities supplied to the system are used to increase the temperature of a working fluid. Since the phase of a working fluid is not changed even while the working fluid passes through the cooler 400 (④→⑤), it is possible to design the system such that the difference between the temperature supplied from a cooling source and the temperature of a working fluid is minimized. Thus, the temperature of a working fluid may be set close to the temperature of the cooling source, and therefore the overall performance of the cycle may be enhanced.

Next, a direct-fired supercritical $CO_2$ power generation system according to a second embodiment of the present disclosure will be described with reference to the drawings.

Figure 6:
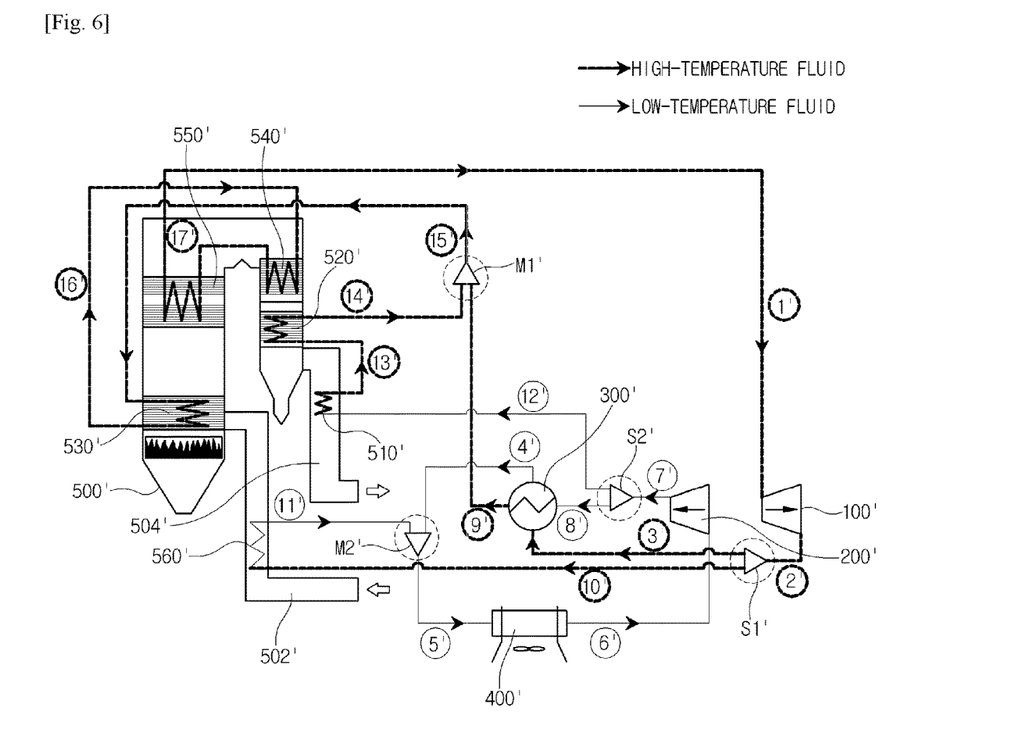
FIG. 6 is a diagram schematically illustrating a direct-fired supercritical $CO_2$ power generation system according to a second embodiment of the present disclosure.
Figure 7:
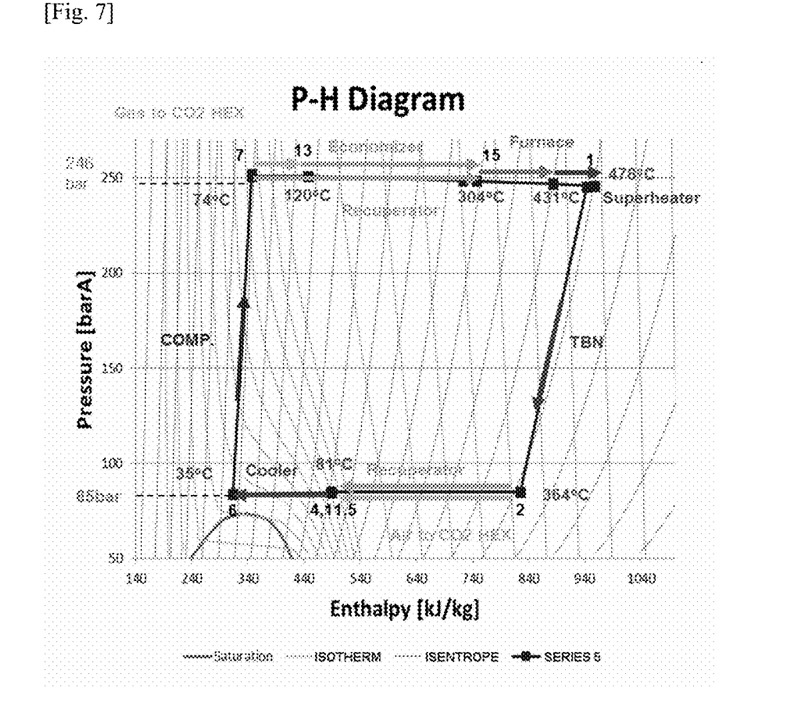
FIG. 7 is a graph illustrating the change of entropy and temperature in the supercritical $CO_2$ cycle of FIG. 6.
Figure 8:
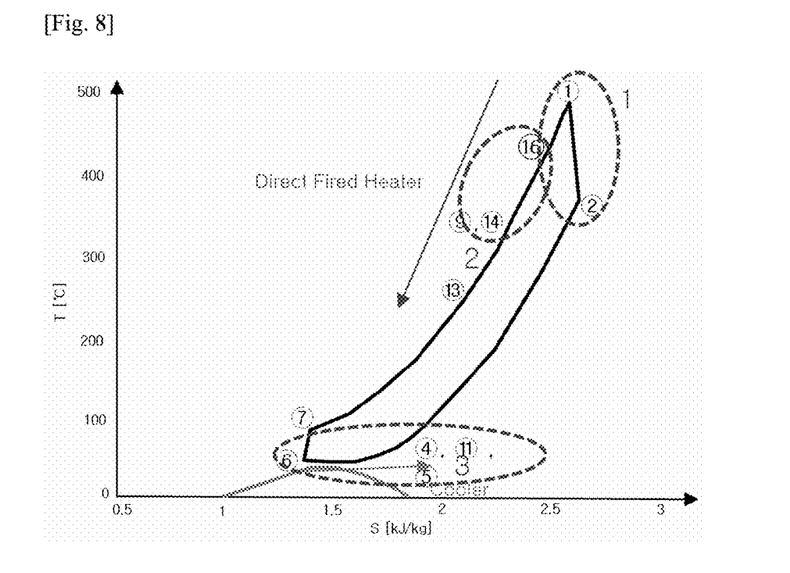
FIG. 8 is a graph illustrating the change of enthalpy and pressure in the supercritical $CO_2$ cycle of FIG. 6.

FIG. 6 is a diagram schematically illustrating the direct-fired supercritical $CO_2$ power generation system according to the second embodiment of the present disclosure. FIG. 7 is a graph illustrating the change of entropy and temperature in the supercritical $CO_2$ cycle of FIG. 6. FIG. 8 is a graph illustrating the change of enthalpy and pressure in the supercritical $CO_2$ cycle of FIG. 6.

As illustrated in FIG. 6, the direct-fired supercritical $CO_2$ power generation system according to the second embodiment of the present disclosure includes a furnace 500' as a direct-fired heater. For convenience' sake, the transfer pipe through which a working fluid flows will be designated by reference numeral indicated in FIG. 6.

The working fluid, which is heated at a high temperature in the furnace 500, is supplied to a turbine 100' and rotatably drives the turbine 100' (①'). Although not shown in the drawings, the turbine 100' is connected to a generator so as to produce electric power. The working fluid, which is expanded while passing through the turbine 100', is branched by a first separator S1' (②'), and a portion (flow rate) m1 of the branched working fluid is transferred to a recuperator 300' (③'). The remainder (flow rate) m2 of the branched working fluid is transferred to an air supply part 502' of the furnace 500', and serves as an air heater 560' to heat the air introduced into the furnace 500' (⑩'). In terms of air, the air serves as the cooler of a working fluid. The air, which is introduced into and heated in the furnace 500', and the cooled working fluid are transferred to a first mixer M1' (⑪'). The heat of the intermediate-temperature working fluid, which has passed through the turbine 100', may be used by branching and using a portion of the working fluid, which has passed the turbine 100' instead of the air preheater 69 included in the conventional steam power generation system.

The working fluid transferred to the recuperator 300' is deprived of heat by the recuperator 300' to be cooled. In this case, the heat of cooling fluid is branched by a second separator S2' to be described later (⑧'), and is supplied to the working fluid passing through the recuperator 300'. The working fluid cooled by the recuperator 300' is transferred to the first mixer M1' (④'), so as to serve as an air preheater 560' to preheat the air introduced into the furnace 500', and is then mixed with the cooled working fluid. The working fluids mixed by the first mixer M1' are transferred to a cooler 400' to be cooled (⑤'). The flow rate of the working fluid mixed by the first mixer M1' is equal to a sum of the flow rates (m1+m2) of the working fluids branched by the first separator S1'.

The low-temperature working fluid cooled while passing through the cooler 400' is transferred to a compressor 200' (⑥'), and is compressed by the compressor 200' to be a low-temperature and high-pressure working fluid. The working fluid, which has passed through the compressor 200' (⑦'), is branched by the second separator S2'. The flow rate m3 of a portion of the branched working fluid is transferred to the recuperator 300' (⑧'), and the flow rate m4 of the remainder is transferred to the furnace 500' (⑫').

The working fluid transferred to the recuperator 300' exchanges heat with the working fluid, which has passed through the turbine 100', as described above, to be recuperated, and is then transferred to a second mixer M2' (⑨'). The working fluid transferred to the furnace 500' is transferred to an exhaust discharge part so as to serve as an exhaust cooler 510', and is then transferred to an economizer 520' located at the discharge end of the furnace 500' (⑬'). In terms of exhaust gas, the exhaust gas serves as the heat source of a working fluid. A working fluid absorbs heat from exhaust gas to cool the exhaust gas, and the working fluid is heated for itself. The working fluid transferred to the economizer 520' is heated again, and is then transferred to the second mixer M2' (⑭').

The flow rates of the working fluids branched by the second separator S2' are mixed (m3+m4) in the second mixer M2', and the mixed working fluid is transferred to and heated in a reheater 530' located above the combustion end of the furnace 500' so as to be adjacent thereto (⑮'). Since the high-temperature working fluid, which has passed through the recuperator 300', is supplied to the furnace 500', the heat absorption efficiency of the furnace 500' may be increased.

The working fluid reheated by the reheater 530' is transferred to superheaters 540' and 550' located at the upper side of the furnace 500' (⑯'), and the high-temperature working heated by the superheaters 540' and 550' (⑰') is recirculated to the turbine 100'.

The temperature and pressure of a working fluid in the above-mentioned supercritical CO$_2$ power generation system will be described briefly with a specific example.

As illustrated in FIG. 7, a working fluid may be discharged at a temperature of about 478° C. from the superheaters 540' and 550', and be introduced into the turbine 100'. Since the working fluid is expanded while passing through the turbine 100', the pressure of the working fluid is lowered to a pressure of about 85 bar from about 247 bar, and the temperature thereof is lowered to a temperature of about 364° C.

The pressure of the working fluid is maintained while passing through the recuperator 300' and the cooler 400', and the temperature thereof may be lowered to a temperature of about 35° C. by heat exchange. Subsequently, the temperature and pressure of the working fluid are increased to a temperature of about 74° C. and a pressure of about 247 bar while passing through the compressor 200', and the working fluid is a low-temperature and high-pressure working fluid.

The low-temperature and high-pressure working fluid is heated to a temperature of about 304° C. by the recuperator 300' and the economizer 520', and is a high-temperature working fluid while passing through the superheaters 540' and 550'. The high-temperature working fluid is circulated to the turbine 100'.

The change of entropy depending on the temperature of a working fluid in the above-mentioned supercritical CO$_2$ power generation system will be described briefly.

Referring to FIG. 8, since the system uses supercritical CO$_2$ as a working fluid, the expansion section (①'→②') of the turbine 100' is smaller than that of the steam cycle of FIG. 2, and no phase change occurs therein. Therefore, the heat quantity required for a phase change may be used to heat a working fluid, and thus the efficiency of the system may be improved. In addition, since the system may be configured to have high efficiency, it is possible to manufacture a small turbine.

In addition, since the phase of a working fluid is not changed even while the working fluid passes through the furnace 500' (⑫→⑬), unlike the steam cycle, all of heat quantities supplied to the system are used to increase the temperature of a working fluid. Since the phase of a working fluid is not changed even while the working fluid passes through the cooler 400' (④→⑤), it is possible to design the system such that the difference between the temperature supplied from a cooling source and the temperature of a working fluid is reduced or minimized. Thus, the temperature of a working fluid may be set close to the temperature of the cooling source, and therefore the overall performance of the cycle may be enhanced.

As is apparent from the above description, a direct-fired supercritical CO$_2$ power generation system according to an embodiment of the present disclosure has an effect of improving heat exchange efficiency since supercritical CO$_2$, in which no phase change occurs, is used as a working fluid. In addition, it is possible to improve the efficiency of power generation by preheating air using a flow rate at the outlet of a turbine as the high-temperature heat source of the power generation system itself to which a separate air preheater is not installed, but a direct-fired method is applied, and by recovering heat from exhaust gas using a low-temperature heat source at the outlet of a compressor. In addition, two compressors are installed in a power generation system according to another embodiment of the present disclosure, and intermediate-temperature and high-temperature working fluids, which have passed through the respective compressors, are mixed and supplied to a direct-fired heater, thereby enabling the overall energy efficiency of the system to be improved.

While the present disclosure has been described with respect to the specific embodiments, it will be apparent to those skilled in the art that various changes and modifications may be made without departing from the spirit and scope of the disclosure.

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

What is claimed is:

1. A CO$_2$ power generation system, comprising:
a furnace that burns fuel;
a turbine that is supplied with a working fluid of supercritical CO$_2$ heated by heat generated in the furnace;
a recuperator that exchanges heat with the working fluid passing through the turbine;
a first separator provided at a rear of the turbine so as to branch the working fluid passing through the turbine into the recuperator and the furnace;
a cooler that cools the working fluid passing through the recuperator; and
a compressor that compresses the working fluid passing through the cooler,
wherein the working fluid passing through the compressor is circulated to the furnace.

2. The CO$_2$ power generation system according to claim 1, further comprising
a first mixer provided at a front of the cooler that mixes the working fluid discharged after heating air introduced into the furnace with the working fluid cooled by the recuperator, and that supplies the mixed working fluid to the cooler; and
a second separator provided at a discharge of the compressor that branches the working fluid passing through the compressor into the furnace and the recuperator.

3. The CO$_2$ power generation system according to claim 2, wherein
the working fluid branched to the furnace by the first separator is cooled after heating the air introduced into the furnace, and is transferred out of the furnace,
the working fluid branched to the recuperator by the first separator is cooled by exchanging heat with a portion of the working fluid passing through the compressor, a portion of the working fluid branched by the second separator is heated by the working fluid branched from the recuperator by the first separator, and a remainder of the working fluid branched by the second separator is heated by depriving exhaust gas discharged from the furnace of heat.

4. The $CO_2$ power generation system according to claim 3, wherein the furnace includes
an economizer provided at a discharge end of the exhaust gas that recovers waste heat of the exhaust gas,
a reheater provided above a combustor of the furnace that heats the working fluid,
a superheater provided at an upper side of the furnace that heats the working fluid, and
a second mixer provided at a rear end of the recuperator that mixes the working fluid passing through the economizer with the working fluid heated while passing through the recuperator via the second separator,
the working fluid heated by depriving the exhaust gas of heat is heated by the economizer, and
the working fluid passing through the reheater is heated by the superheater and is then circulated to the turbine.

5. A $CO_2$ power generation system, comprising:
a furnace that burns fuel;
a turbine that is supplied with a working fluid of supercritical $CO_2$ heated by heat generated in the furnace;
a recuperator that exchanges heat with the working fluid passing through the turbine;
a first separator provided at a rear of the turbine that branches the working fluid passing through the turbine into the recuperator and the furnace;
a cooler that cools the working fluid passing through the recuperator; and
a compressor that compresses the working fluid passing through the cooler,
wherein a cycle from the furnace to the compressor is a closed loop.

6. The $CO_2$ power generation system according to claim 5, wherein
the working fluid branched to the recuperator is cooled by exchanging heat with a portion of the working fluid passing through the compressor, and
the working fluid branched to the furnace is cooled after heating air introduced into the furnace; and
the first separator controls a flow rate of the working fluid such that a temperature of the working fluid passing through the recuperator after heat exchange of the working fluid is equal to a temperature of the working fluid after the working fluid heats the air introduced into the furnace.

7. The $CO_2$ power generation system according to claim 6, further comprising
a first mixer provided at a front of the cooler that mixes the working fluid discharged after heating the air introduced into the furnace with the working fluid cooled by the recuperator, and that supplies the mixed working fluid to the cooler; and
a second separator provided at a discharge of the compressor that branches the working fluid passing through the compressor into the furnace and the recuperator, wherein
a portion of the working fluid branched by the second separator is heated by the working fluid branched from the recuperator by the first separator, and
a remainder of the working fluid branched by the second separator is heated by depriving exhaust gas discharged from the furnace of heat.

8. The $CO_2$ power generation system according to claim 7, wherein the furnace includes
an economizer provided at a discharge of the exhaust gas that recovers waste heat of the exhaust gas;
a reheater provided above a combustor of the furnace that heats the working fluid;
a superheater provided at an upper side of the furnace that heats the working fluid; and
a second mixer provided at a rear of the recuperator that mixes the working fluid passing through the economizer with the working fluid heated while passing through the recuperator via the second separator.

9. The $CO_2$ power generation system according to claim 8, wherein
the working fluid heated by depriving the exhaust gas of heat is heated by the economizer;
the second separator controls a flow rate of the working fluid such that a temperature of the working fluid after heat exchange of the working fluid in the recuperator via the second separator is equal to a temperature of the working fluid passing through the economizer; and
the working fluid passing through the reheater is heated by the superheater and is then circulated to the turbine.

10. A $CO_2$ power generation system, comprising:
a turbine that is operated by a working fluid of supercritical $CO_2$;
a recuperator that exchanges heat with the working fluid passing through the turbine;
a cooler that cools the working fluid passing through the recuperator;
a first compressor that compresses the working fluid passing through the cooler;
a second compressor that compresses a portion of the working fluid passing through the recuperator;
a separator provided at a rear of the recuperator that branches the working fluid passing through the turbine into the cooler and the second compressor; and
a furnace into which the working fluid passing through the first and second compressors is introduced to be heated by combustion heat,
wherein the working fluid is circulated to the turbine via the furnace.

11. The $CO_2$ power generation system according to claim 10, further comprising a separator provided at a rear of the recuperator that branches the working fluid passing through the turbine into the cooler and the second compressor.

12. The $CO_2$ power generation system according to claim 10, wherein
the working fluid branched to the cooler by the separator is cooled by the cooler, and is then transferred to the first compressor,
the working fluid branched to the second compressor by the separator is compressed by the second compressor, and is then transferred to the furnace,
the working fluid transferred to the recuperator via the turbine is cooled by exchanging heat with the working fluid compressed by the first compressor, and is then transferred to the separator, and
the working fluid compressed by the first compressor is recuperated in the recuperator by exchanging heat with the working fluid transferred to the recuperator via the turbine, and is then transferred to the furnace.

13. The $CO_2$ power generation system according to claim 12, wherein the furnace includes an economizer provided at a discharge of the exhaust gas that recovers waste heat of the exhaust gas, a reheater provided above a combustor of the furnace that heats the working fluid, a superheater provided at an upper side of the furnace that heats the working fluid, and a mixer that mixes the working fluid heated while passing through the economizer with the working fluid recuperated by the recuperator via the first compressor.

14. The $CO_2$ power generation system according to claim 13, wherein the working fluid passing through the second compressor is transferred to and heated in the economizer, the working fluid mixed by the mixer is transferred to and heated in the reheater, and the working fluid heated by the reheater is transferred to and heated in the superheater, and is then circulated to the turbine.

15. A $CO_2$ power generation system comprising:

a turbine that is operated by a working fluid of supercritical $CO_2$;

a recuperator that exchanges heat with the working fluid passing through the turbine;

a cooler that cools the working fluid passing through the recuperator;

a first compressor that compresses the working fluid passing through the cooler;

a second compressor that compresses a portion of the working fluid passing through the recuperator;

a separator provided at a rear of the recuperator that branches the working fluid passing through the turbine into the cooler and the second compressor; and a furnace into which the working fluid passing through the first and second compressors is introduced to be heated by combustion heat, wherein a cycle from the turbine to the furnace is a closed loop.

16. The $CO_2$ power generation system according to claim 15, further comprising a mixer that mixes the working fluid heated while passing through an economizer in the furnace with the working fluid recuperated by the recuperator via the first compressor.

17. The $CO_2$ power generation system according to claim 16, wherein the furnace includes the economizer, which is provided at a discharge of the exhaust gas that recovers waste heat of the exhaust gas;

a reheater provided above a combustor of the furnace that heats the working fluid; and a superheater provided at an upper side of the furnace that heats the working fluid.

18. The $CO_2$ power generation system according to claim 17, wherein the working fluid transferred to the recuperator via the turbine is cooled by exchanging heat with the working fluid compressed by the first compressor, and is then transferred to the separator, the working fluid branched to the cooler by the separator is cooled by the cooler, and is then transferred to the first compressor, and the working fluid branched to the second compressor by the separator is compressed by the second compressor, and is then transferred to the economizer.

19. The $CO_2$ power generation system according to claim 18, wherein the separator controls a flow rate of the working fluid branched to the second compressor such that a temperature of the working fluid after heat exchange of the working fluid recuperated in the recuperator via the first compressor is equal to a temperature of the working fluid passing through the economizer.

20. The $CO_2$ power generation system according to claim 19, wherein the working fluid mixed by the mixer is transferred to and heated in the reheater, and the working fluid heated by the reheater is transferred to and heated in the superheater, and is then circulated to the turbine.

* * * * *